(No Model.)

C. W. JOHNSON.
THREE WAY VALVE.

No. 406,141. Patented July 2, 1889.

Witnesses
H. Gardner
T. L. Tuttle

Inventor
C. W. Johnson.
By Hawes & Chapman.
Attorneys.

UNITED STATES PATENT OFFICE.

CHARLES W. JOHNSON, OF HOLYOKE, MASSACHUSETTS.

THREE-WAY VALVE.

SPECIFICATION forming part of Letters Patent No. 406,141, dated July 2, 1889.

Application filed April 2, 1888. Serial No. 269,227. (No model.)

*To all whom it may concern:*

Be it known that I, CHARLES W. JOHNSON, of Holyoke, in the county of Hampden and Commonwealth of Massachusetts, have invented a new and useful Improvement in Three-Way Valves, of which the following is a specification, reference being had to the accompanying drawings, forming part thereof.

My invention relates to that class of valves governing three independent passages for fluid or liquid, known as "three-way valves;" and it has for its object to provide a valve of this nature which will be composed of few parts, and therefore inexpensive, which by a very slight movement will open communication between any two of the passages which it controls, while it securely closes the third passage, and in which the pressure of the fluid or liquid conducted thereto by one of said passages is utilized to augment the perfect operation of the valve with respect to the remaining passages.

To these ends my invention consists in the valve constructed as hereinafter fully described, and particularly pointed out in the claim.

Figure 1:
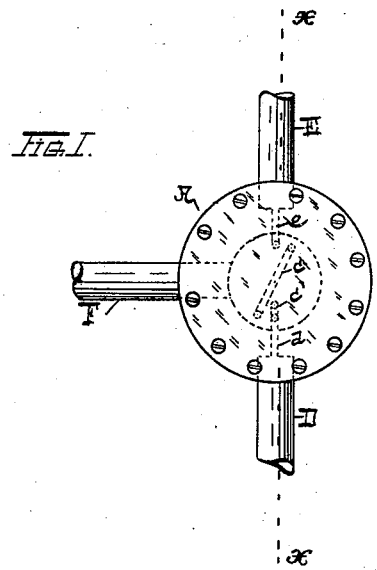
Figure 2:
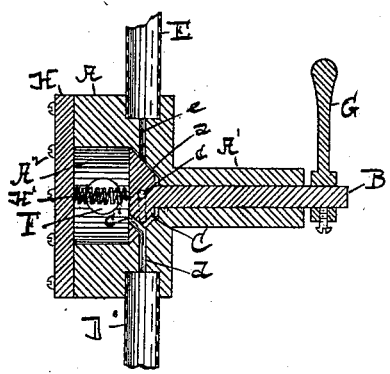

In the drawings, in which like parts are designated by like letters in the several figures, Figure 1 is a plan view of the valve. Fig. 2 is a vertical section thereof taken upon line $x$ $x$ of Fig. 1.

The letter A designates the valve-shell, which is preferably provided with the extension A' at one end, said shell and extension being bored centrally to receive the stem B, and said shell being counterbored to form the chamber $A^2$. The bottom of chamber $A^2$ is made in the form of a truncated cone, whereby an annular beveled seat $a$ is formed, upon which rests a correspondingly-beveled disk or plug C, preferably made integral with stem B, as shown. Two pipes D E communicate with the valve-chamber by means of ducts or passages $d$ $e$, respectively, which extend between seat $a$ and the ends of said pipes, while a third pipe F communicates directly with said chamber above the plane of seat $a$ and disk C. A port or passage $c$, extending laterally through the disk C, registers at its ends with ducts $d$ $e$ when the disk is in one position, and a port or passage $c'$, extending transversely through said disk in a diagonal direction, is located at such point therein that a slight rotary movement imparted to the disk will bring its inner end opposite one of the ducts $d$ $e$—for example, the former, as shown in the drawings—such movement of the disk moving port $c$ out of register with said ducts. In one position of the disk, therefore, pipes D and E will be in open communication with each other through port $c$, while communication between said pipes and pipe F will be closed, and in the second position of said disk pipes F and D will be in open communication with each other through port $c'$, while that between said pipes and pipe E will be closed.

I have shown pipes D E entering the valve-shell at diametrically-opposite points and port $c$ extending diametrically across the disk; but such arrangement is not material, inasmuch as said pipes could enter the shell at any two desired points of its circumference in the plane of seat $a$, or even out of said plane, it being essential merely that ducts $d$ $e$ shall terminate at their inner ends at said seat, and that port $c$ shall connect one of said ducts with the other in one position of the disk. The end of stem B projects beyond the end of extension A' of the shell, and may be provided with means for manually rotating it and the disk—such as the handle G shown—or may be suitably connected with means for mechanically producing such movement.

A cap H, secured to the valve-shell by screws, as shown, or in any suitable manner, closes the valve-chamber, and a perfectly-tight joint between said cap and the shell can be obtained by the use of packing in the usual manner.

A coil-spring H', secured at one end to cap H and bearing at its opposite end against the disk, serves to prevent the latter from leaving its seat, and also compensates for wear of the disk or its seat, which latter, however, owing to the very limited movement of the disk, is very slight. When the pipe F is a supply-pipe, leading, for example, from a street-main, the pressure of the water which constantly fills chamber $A^2$ will itself hold the disk to its seat, and thus augment the perfect operation of the valve.

The only function of the extension A' of the shell is to form a bearing for stem B, and it can therefore be increased or diminished in length within reasonable limits without materially affecting the operation of the valve, and said stem can be suitably secured to the disk instead of being made integral therewith; but I prefer the construction shown, inasmuch as it enables me to turn the disk and stem in a lathe at one operation.

By removing cap H access is directly given to the disk C and chamber $A^2$, and said disk can be readily removed from the shell by removing the handle from the end of stem B, which permits the latter to be withdrawn from extension $A'$.

The valve thus constructed is designed to be used wherever three-way valves have heretofore been employed, and its operation is made fully apparent from the foregoing description.

It will be observed that so far as the disk or plug is concerned the use of packing to secure a tight joint thereof with its seat is entirely obviated, and that a binding action between said disk and its seat cannot occur.

I do not wish to limit myself to the exact conformation or relative proportions of the several parts of the valve herein shown and described, as it is obvious that modifications therein can be made without departing from the spirit of my invention.

Having thus fully described my invention, what I claim, and desire to secure by Letters Patent, is—

The three-way valve herein described, consisting of shell A, having the tubular extension $A'$, and having the chamber $A^2$, terminating at its inner end in the annular beveled seat $a$, pipes D E, having their ends suitably connected with said shell, and having their interiors connected with said seat $a$ by means of ducts $d\,e$, pipe F, communicating with chamber $A^2$, near the outer end thereof, flattened disk C, having the stem B, and having its periphery beveled to correspond with seat $a$, said disk being provided with port $c$, extending between two points in the periphery thereof, and with port $c'$, extending from the outer side to the periphery thereof, cap H, closing the outer end of the shell, and spring $H'$, bearing at one end against said cap and at its opposite end against disk C, at the center of the latter, combined and operating substantially as set forth.

CHARLES W. JOHNSON.

Witnesses:
W. N. CHAPMAN,
F. L. TUTTLE.